United States Patent
Tian et al.

(10) Patent No.: US 10,281,763 B2
(45) Date of Patent: May 7, 2019

(54) DISPLAY PANEL, DISPLAY APPARATUS AND MANUFACTURING METHOD OF DISPLAY PANEL

(71) Applicant: BOE TECHNOLOGY GROUP CO., LTD., Beijing (CN)

(72) Inventors: Yunyun Tian, Beijing (CN); Hyunsic Choi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/678,086

(22) Filed: Aug. 15, 2017

(65) Prior Publication Data

US 2018/0081238 A1    Mar. 22, 2018

(30) Foreign Application Priority Data

Sep. 21, 2016  (CN) .......................... 2016 1 0839200

(51) Int. Cl.
*G02F 1/133* (2006.01)
*G02F 1/1335* (2006.01)

(52) U.S. Cl.
CPC .. *G02F 1/133526* (2013.01); *G02F 1/133512* (2013.01)

(58) Field of Classification Search
CPC ......... G02F 1/133526; G02F 1/133504; G02F 1/133512; G02F 2001/133567
See application file for complete search history.

(56) References Cited

U.S. PATENT DOCUMENTS

| | | | |
|---|---|---|---|
| 5,151,801 A | | 9/1992 | Hiroshima |
| 5,541,751 A | * | 7/1996 | Sumida .................. G02F 1/135 349/116 |
| 9,423,646 B2 | * | 8/2016 | Nam ................. G02F 1/133526 |
| 9,857,621 B1 | * | 1/2018 | Gu ....................... G02B 3/0056 |
| 2003/0122999 A1 | | 7/2003 | Chae |

(Continued)

FOREIGN PATENT DOCUMENTS

| | | |
|---|---|---|
| CN | 101004509 A | 7/2007 |
| CN | 103413495 A | 11/2013 |

(Continued)

OTHER PUBLICATIONS

First Chinese Office Action dated Oct. 19, 2018, received for corresponding Chinese Application No. 201610839200.5.

*Primary Examiner* — Mariceli Santiago
(74) *Attorney, Agent, or Firm* — Kinney & Lange, P.A.

(57) ABSTRACT

The present disclosure relates to a display panel, a display apparatus and a manufacturing method of a display panel. The display panel comprises a first substrate and a second substrate provided oppositely, wherein the second substrate has a light-transmitting zone and a light-shielding zone adjacent to the light-transmitting zone, wherein the display panel further comprises: an optical element provided on a light entrance side, which is away from the second substrate, of the first substrate, wherein a projection of the optical element on the first substrate and a projection of the light-shielding zone on the first substrate at least partly overlap, and the optical element is configured to deflect a light, which enters from the light entrance side of the first substrate and goes towards the light-shielding zone, to the light-transmitting zone.

17 Claims, 6 Drawing Sheets

(56) References Cited

U.S. PATENT DOCUMENTS

| | | | | |
|---|---|---|---|---|
| 2005/0063068 A1* | 3/2005 | Sakurai | ............... | G02B 3/0056 |
| | | | | 359/626 |
| 2015/0042926 A1* | 2/2015 | Akasaka | ........... | G02F 1/133526 |
| | | | | 349/95 |
| 2015/0277187 A1* | 10/2015 | Akasaka | ........... | G02F 1/133526 |
| | | | | 349/57 |
| 2016/0245961 A1* | 8/2016 | Akasaka | .............. | G02B 3/0068 |

FOREIGN PATENT DOCUMENTS

| | | |
|---|---|---|
| GB | 2315356 A | 1/1998 |
| TW | 200931130 A | 7/2009 |

\* cited by examiner

DISPLAY PANEL, DISPLAY APPARATUS AND MANUFACTURING METHOD OF DISPLAY PANEL

CROSS-REFERENCE TO RELATED APPLICATION

This application claims priority to Chinese Patent Application No. 201610839200.5, filed on Sep. 21, 2016, the content of which is incorporated herein by reference in entirety.

TECHNICAL FIELD

The present disclosure relates to the field of display technology, and more particularly, to a display panel, a display apparatus and a manufacturing method of a display panel.

BACKGROUND

As development of the thin film field effect transistor display (TFT-LCD Display) technology, as well as improvement of industrial technologies, decrease of production costs of liquid crystal display devices, and improvement of producing processes, TFT-LCD has replaced cathode ray tube display and becomes the primary technology in the panel display field, and becomes an optimal display device in the market and for the consumers due to advantages thereof. At present, since commercial liquid display screens with various modes and various sizes have been popular, it is more and more important to overcome the technical disadvantages of LCDs.

At present, popular modes of commercial TFT-LCDs includes: twisted nematic (TN) type, in plane switching (IPS) type and advanced super dimension switch (ADS) type. The ADS mode can improve the image quality of the TFT-LCD product, and has advantages, such as high resolution, high transmittance, low power consumption, wide visual angle, high aperture ratio, low chromatic aberration, and no push Mura, which makes it become primary technology in the field of high-level display.

However, the displaying brightness of a display may be affected by a black matrix (BM). Light may be shielded by the black matrix and cannot go out from a color filter substrate, which results in a relatively low utilization rate of light.

SUMMARY

An object of the present disclosure is to provide a display panel.

In a first aspect of the present disclosure, there is provided a display panel, comprising a first substrate and a second substrate provided oppositely, wherein the second substrate has a light-transmitting zone and a light-shielding zone adjacent to the light-transmitting zone, wherein the display panel further comprises:

an optical element provided on a light entrance side, which is away from the second substrate, of the first substrate, wherein a projection of the optical element on the first substrate and a projection of the light-shielding zone on the first substrate at least partly overlap, and the optical element is configured to deflect a light, which enters from the light entrance side of the first substrate and goes towards the light-shielding zone, to the light-transmitting zone.

In an example, the optical element comprises a deflecting layer having a shape of a concave lens.

In an example, the optical element further comprises a flatting layer, which has a shape complementary to the deflecting layer, to flat a concave surface of the deflecting layer.

In an example, the concave surface of the deflecting layer is away from the first substrate, and the deflecting layer is positioned between the flatting layer and the first substrate.

In an example, the concave surface of the deflecting layer faces the first substrate, and the flatting layer is positioned between the deflecting layer and the first substrate.

In an example, the deflecting layer has a refractive index larger than that of the flatting layer.

In an example, the refractive index of the deflecting layer and that of the flatting layer have a difference ranging from 2 to 3.

In an example, the deflecting layer has a width equal to that of the light-shielding zone of the second substrate, and the deflecting layer has a curvature radius larger than half of the width of the deflecting layer.

In an example, a distance between the deflecting layer and the light-shielding zone of the second substrate ranges from 135 to 185 μm.

In an example, the deflecting layer comprises silicon nitride and silica, and the flatting layer comprises a resin.

Another object of the present disclosure is to provide a display apparatus.

In a second aspect of the present disclosure, there is provided a display apparatus comprising the display panel as above.

Still another object of the present disclosure is to provide a manufacturing method of a display panel.

In a third aspect of the present disclosure, there is provided a manufacturing method of the display panel, comprising:

providing a first substrate;

forming an optical element on the first substrate;

providing a second substrate having a light-transmitting zone and a light-shielding zone adjacent to the light-transmitting zone; and subjecting the first substrate and the second substrate to cell assembly via an alignment mark on the first substrate and an alignment mark on the second substrate, so that after the cell assembly has been performed, the first substrate and the second substrate are provided oppositely and the optical element is positioned on a light entrance side, which is away from the second substrate, of the first substrate, wherein a projection of the optical element on the first substrate and a projection of the light-shielding zone on the first substrate at least partly overlap, and the optical element is configured to deflect a light, which enters from the light entrance side of the first substrate and goes towards the light-shielding zone, to the light-transmitting zone.

In an example, forming an optical element on the first substrate comprises: forming a deflecting layer, wherein the deflecting layer has a shape of a concave lens.

In an example, forming an optical element on the first substrate further comprises: forming a flatting layer, wherein the flatting layer has a shape complementary to the deflecting layer, to flat a concave surface of the deflecting layer.

In an example, forming the optical element comprises: forming the deflecting layer on the first substrate; and forming the flatting layer on the deflecting layer.

In an example, forming the deflecting layer on the first substrate comprises forming a deflecting material layer; and patterning the deflecting material layer to form the deflecting layer having the shape of the concave lens, wherein the patterning the deflecting material layer comprises:

forming a photoresist layer on the deflecting material layer, subjecting the photoresist layer to uneven exposure;

developing the photoresist layer, so that the photoresist layer has a shape of a concave surface conform to the shape of the concave lens;

etching the photoresist layer and the deflecting material layer by an ion beam etching process, to form the deflecting layer having the shape of the concave lens; and removing the photoresist layer.

In an example, forming an optical element comprises: forming the flatting layer on the first substrate; and forming the deflecting layer on the flatting layer.

In an example, forming the flatting layer on the first substrate comprises:

depositing a flatting material layer on the first substrate; patterning the flatting material layer to form the flatting layer having a shape complementary to the shape of the concave lens of the deflecting layer.

In an example, the patterning the flatting material layer comprises:

forming an upper surface of the flatting material layer by using a photosensitive resin;

subjecting the photosensitive resin to uneven exposure; and developing the photosensitive resin, so that the photosensitive resin has a shape of convex surface complementary to the shape of the concave lens.

In an example, the patterning the flatting material layer comprises:

etching the flatting material layer by an ion beam etching process, so that the flatting material layer has a shape of convex surface complementary to the shape of the concave lens.

BRIEF DESCRIPTION OF FIGURES

In order to illustrate the technical solutions of examples of the present invention more clearly, the figures of the examples will be described briefly below. It should be known that the description of the figures below merely relates to some examples of the present invention, rather than the limitation to the present invention, wherein.

DESCRIPTION OF EMBODIMENTS

To make the objective, technical solution and advantages of the examples of the present invention more clear, the technical solution of the example in the present invention will be described clearly and completely below, with reference to the figures. Obviously, the described examples are some examples of the present invention, not all of them. All other examples obtained by those skilled in the art without the exercise of inventive skill, based on the described examples in the present invention, also fall into the scope of the present invention.

When introducing the elements and their examples in the present disclosure, "a", "an", "the" and "said" are aimed to represent there are one or more element(s). The terms "comprise", "include", "contain" and "have" are aimed to be inclusive and represent that there may be other elements in addition to the listed elements.

For the purpose of surface description below, as orientated in the figures, terms "up", "down", "left", "right", "perpendicular", "horizontal", "top", "bottom" and the derivative terms thereof should relates to the invention. The terms "overlying", "on the top of . . . ", "locate on . . . " or "locate on the top of . . . " means that a first element such as a first structure is above a second element such as a second structure, wherein there may be an intermediate element such as an interface structure between the first element and the second element. The term "contact" means to connect the first element such as first structure and the second element such as the second structure, and there may be or may be no other elements at the interface of the two elements.

An example of the present invention provides a display panel, a display apparatus, and a manufacturing method of a display panel, and can at least partially solve the problem in the art that the unusable light in light-shielding zones of a display panel causes a relatively low utilization rate of light.

The display panel, the display apparatus, and the manufacturing method of the display panel provided in examples of the present invention may increase the transmittance of a display panel and provide a solution for high alignment accuracy, by means of providing an optical element on a light entrance side, which is away from the second substrate, of the first substrate, wherein a projection of the optical element on the first substrate and a projection of the light-shielding zone on the first substrate at least partly overlap, and the optical element is configured to deflect a light, which enters from the light entrance side of the first substrate and goes towards the light-shielding zone, to the light-transmitting zone.

An example of the present invention provides a display panel, comprising a first substrate and a second substrate provided oppositely, wherein the second substrate has a light-transmitting zone and a light-shielding zone adjacent to the light-transmitting zone, wherein the display panel further comprises: an optical element provided on a light entrance side, which is away from the second substrate, of the first substrate, wherein a projection of the optical element on the first substrate and a projection of the light-shielding zone on the first substrate at least partly overlap, and the optical element is configured to deflect a light, which enters from the light entrance side of the first substrate and goes towards the light-shielding zone, to the light-transmitting zone.

Figure 1:
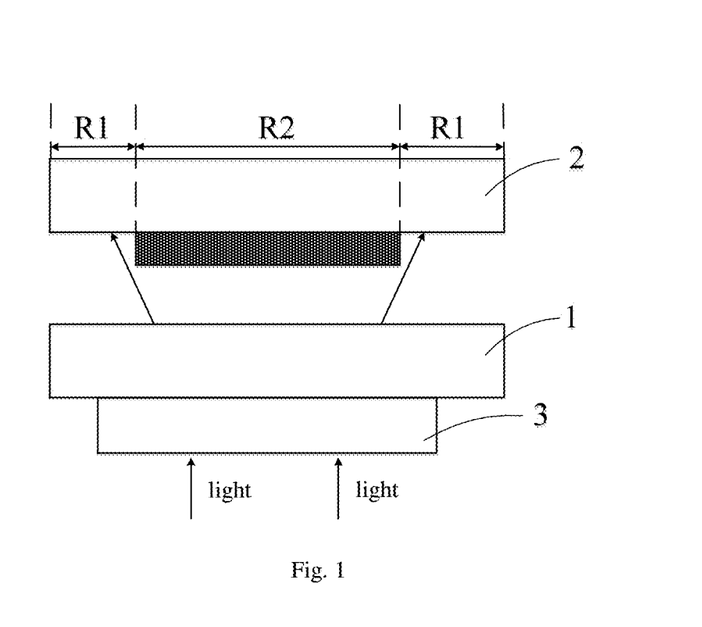
FIG. 1 is a schematic drawing of a display panel according to an example of the present invention.

FIG. 1 is a schematic drawing of a display panel according to an example of the present invention. As shown in FIG. 1, the display panel comprises a first substrate 1 and a second substrate provided 2 oppositely, wherein the second substrate 2 has a light-transmitting zone R1 and a light-shielding zone R2 adjacent to the light-transmitting zone R1. The display panel further comprises: an optical element 3 provided on a light entrance side, which is away from the second substrate 2, of the first substrate 1, wherein a projection of the optical element 3 on the first substrate 1 and a projection of the light-shielding zone R2 on the first substrate 1 at least partly overlap, and the optical element is configured to deflect a light, which enters from the light entrance side of the first substrate 1 and goes towards the light-shielding zone R2, to the light-transmitting zone R1.

Figure 2:
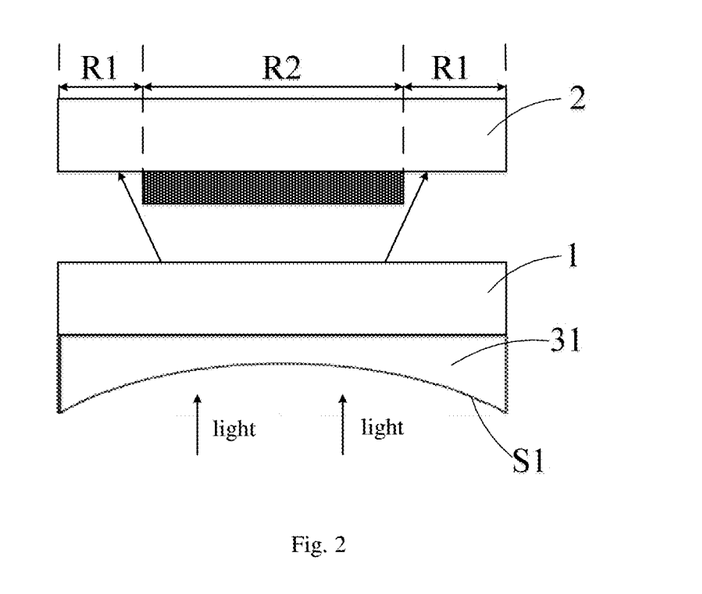
FIG. 2 is a schematic drawing of a display panel according to an example of the present invention.

FIG. 2 is a schematic drawing of a display panel according to an example of the present invention. As shown in FIG. 2, the optical element comprises a deflecting layer 31 having a shape of a concave lens. As can be seen from FIG. 2, the deflecting layer 31 has a concave surface S1. As shown in FIG. 2, the scattering function of the concave lens enable a light, which passes through the deflecting layer and enters from the first substrate and goes towards the light-shielding zone of the second substrate, to deflect to the light-transmitting zone of the second substrate.

Figure 3:
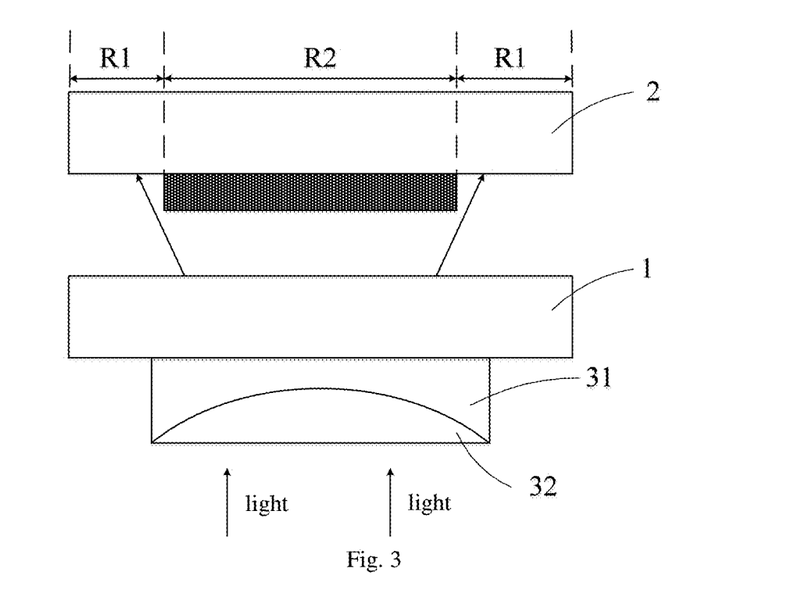
FIG. 3 is a schematic drawing of a display panel according to an example of the present invention.

FIG. 3 is a schematic drawing of a display panel according to an example of the present invention. As shown in FIG. 3, the optical element further comprises a flatting layer 32, which has a shape complementary to the deflecting layer 31, to flat a concave surface of the deflecting layer 31.

In the example shown in FIG. 3, the concave surface of the deflecting layer 31 is away from the first substrate 1, and the deflecting layer 31 is positioned between the flatting layer 32 and the first substrate 1. It should be pointed out that the position relationship between the deflecting layer and the flatting layer is not limited to the case shown in FIG. 3.

Figure 4:
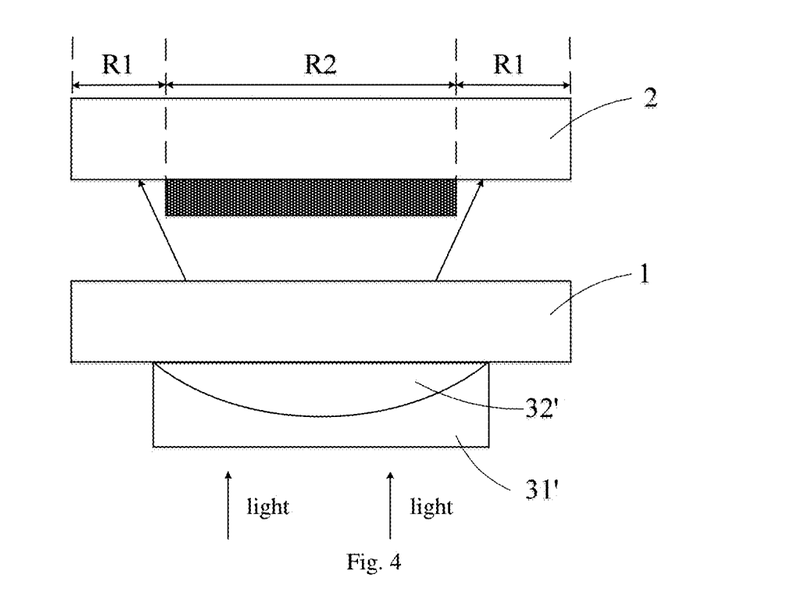
FIG. 4 is a schematic drawing of a display panel according to an example of the present invention.

FIG. 4 is a schematic drawing of a display panel according to an example of the present invention. In the example shown in FIG. 4, the concave surface of the deflecting layer 31' faces the first substrate 1, and the flatting layer 32' is positioned between the deflecting layer 31' and the first substrate 1.

The scattering function of the deflecting layer may be adjusted by adjusting the difference between the refractive indices of the deflecting layer and the flatting layer and/or the gradient of the deflecting layer, so that the light-shielding zone of the second substrate may be evaded better. In an embodiment, the deflecting layer has a refractive index larger than that of the flatting layer. For example, the refractive index of the deflecting layer and that of the flatting layer have a difference ranging from 2 to 3. In an embodiment, the deflecting layer has a width equal to that of the light-shielding zone (e.g. a black matrix), and the deflecting layer has a curvature radius larger than half of the width of the deflecting layer. In an embodiment, the distance between the deflecting layer and the light-shielding zone of the second substrate (i.e. the minimum among the distances from an arbitrary point on the deflecting layer to the second substrate) ranges from 135 to 185 µm.

The deflecting layer may be a material having a relatively high refractive index. For example, the deflecting layer may comprise silicon nitride and silica, and the flatting layer may comprise a resin.

Figure 5:
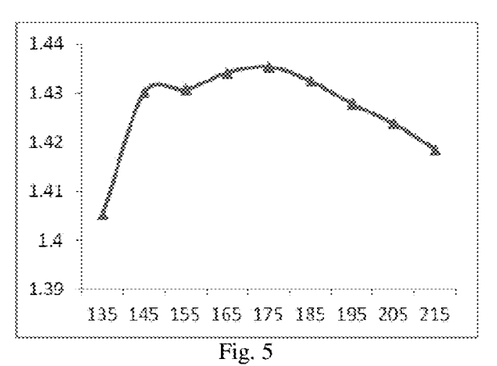
FIG. 5 is a test curve, showing improvement of transmittance of a display panel having an optical element caused by various distances between the optical element and the light-shielding zone of the second substrate, when the other factors are constant.

FIG. 5 shows improvement of transmittance of a display panel having an optical element caused by various distances between the optical element and the light-shielding zone of the second substrate, when the other factors are constant. In FIG. 5, the abscissa represents the distance (unit: µm) between the optical element and the light-shielding zone (e.g. a black matrix) of the second substrate, and the ordinate shows the ratios of transmittance of a display panel using an optical element to transmittance of a display panel without using an optical element, according to examples of the present invention. Here, the distance between the optical element and the light-shielding zone of the second substrate refers to the distance from the part of the optical element, which is closest to the light-shielding zone, to the light-shielding zone. As can be seen, the ratios of transmittance of a display panel using an optical element to transmittance of a display panel without using an optical element are always higher than 1, according to examples of the present invention. Therefore, the display panels having an optical element according to examples of the present invention have improved utilization rate of light.

The study of the present inventors shows that obvious increase of light efficiency may be obtained by controlling the distance between the deflecting layer and the light-shielding zone of the second substrate in a certain range (for example, 135-185 µm, as shown in FIG. 5). Preferably, according to an example of the present invention, the distance between the optical element and the light-shielding zone of the second substrate is set by setting parameters of the first substrate and the second substrate, in order to satisfy the above-mentioned range.

Figure 6:
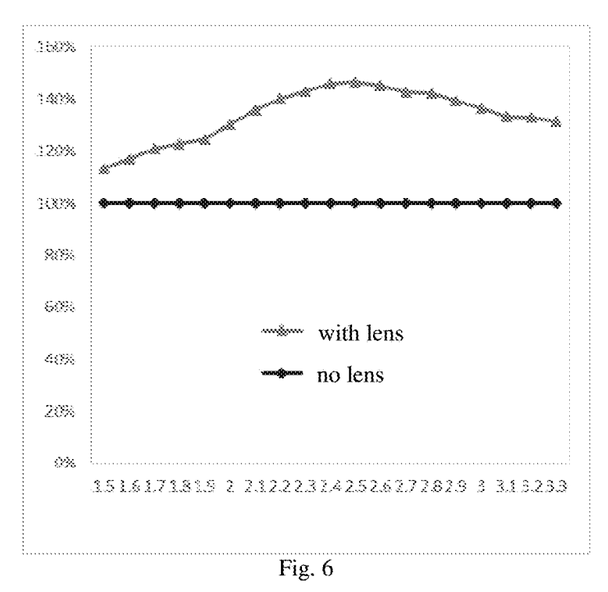
FIG. 6 is a test curve, showing improvement of transmittance of a display panel having an optical element by various difference values between the refractive index of the deflecting layer and that of the flatting layer, when the other factors are constant.

FIG. 6 shows improvement of transmittance of a display panel having an optical element by various difference values between the refractive index of the deflecting layer and that of the flatting layer, when the other factors are constant. In FIG. 6, the abscissa represents the difference between the refractive index of the deflecting layer and that of the flatting layer, and the ordinate shows the ratios of transmittance of a display panel using an optical element to transmittance of a display panel without using an optical element, according to examples of the present invention. As can be seen, obvious increase of light efficiency may be obtained by setting the difference between the refractive index of the deflecting layer and that of the flatting layer in the range from 2 to 3.

An example of the present invention also provides a manufacturing method of the display panel according to claim 1, comprising: providing a first substrate and a second substrate, so that the first substrate and the second substrate are provided oppositely, wherein the second substrate is configured to have a light-transmitting zone and a light-shielding zone adjacent to the light-transmitting zone. The manufacturing method of the display panel further comprises: providing an optical element on the first substrate, so that the optical element is at the light entrance side away from the second substrate, and a projection of the optical element on the first substrate and a projection of the light-shielding zone on the first substrate at least partly overlap, wherein the optical element is configured to deflect a light, which enters from the light entrance side of the first substrate and goes towards the light-shielding zone, to the light-transmitting zone.

Figure 7:
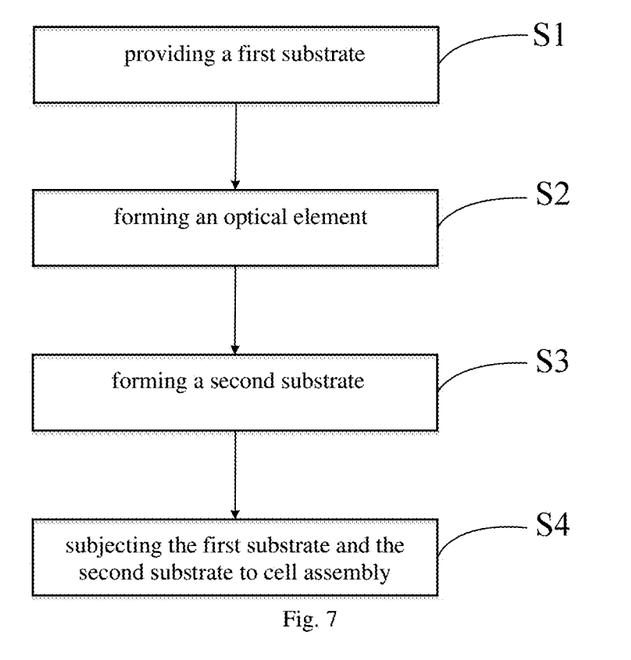
FIG. 7 is a schematic flow chart of a method according to an example of the present invention.

FIG. 7 is a schematic flow chart of a method according to an example of the present invention. As shown in FIG. 7, a manufacturing method of a display panel comprises:

S1. providing a first substrate;

S2. forming an optical element on the first substrate;

S3. providing a second substrate having a light-transmitting zone and a light-shielding zone adjacent to the light-transmitting zone; and S4. subjecting the first substrate and the second substrate to cell assembly via an alignment mark on the first substrate and an alignment mark on the second substrate, so that after the cell assembly has been performed, the first substrate and the second substrate are provided oppositely and the optical element is positioned on a light entrance side, which is away from the second substrate, of the first substrate, wherein a projection of the optical element on the first substrate and a projection of the light-shielding zone on the first substrate at least partly overlap, and the optical element is configured to deflect a light, which enters from the light entrance side of the first substrate and goes towards the light-shielding zone, to the light-transmitting zone.

In an embodiment, forming an optical element on the first substrate comprises forming a deflecting layer, and the deflecting layer has a shape of a concave lens.

In an embodiment, forming an optical element on the first substrate further comprises forming a flatting layer, and the flatting layer has a shape complementary to the deflecting layer, so that the optical element has a shape of rectangle.

Figure 8:
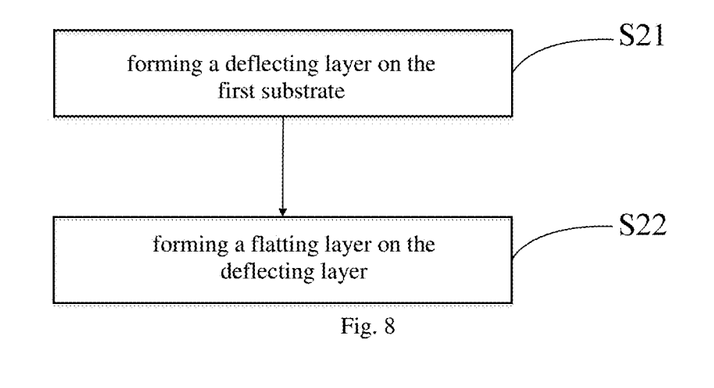
FIG. 8 is a flow chart of a method for forming an optical element according to an example of the present invention.

FIG. 8 is a flow chart of a method for forming an optical element according to an example of the present invention. Specifically, as shown in FIG. 8, forming an optical element may comprise the following steps:

S21. forming the deflecting layer on the first substrate; and

S22. forming the flatting layer on the deflecting layer.

Figure 9:
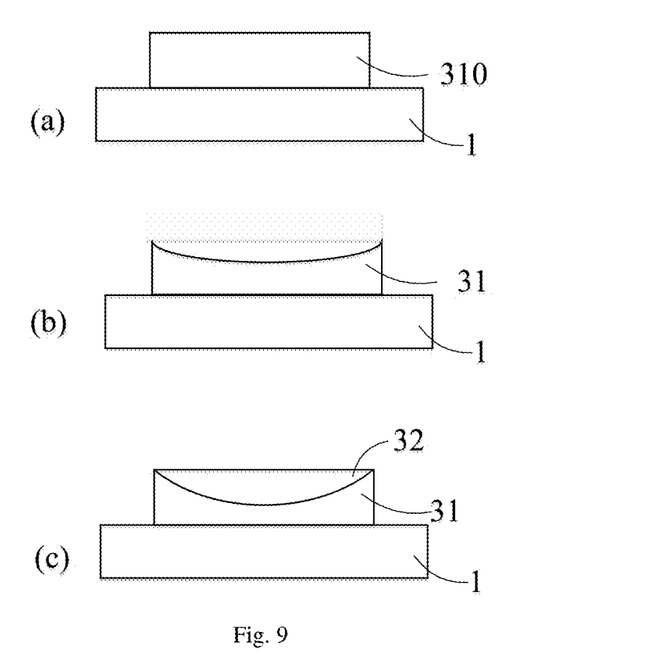
FIG. 9 is a further schematic drawing of a method for forming an optical element according to the example of FIG. 8.

FIG. 9 is a further schematic drawing of a method for forming an optical element according to the example of FIG. 8. As shown in FIG. 9, the method of forming the optical element specifically comprises the following steps.

A deflecting material layer 310 is deposited on the first substrate;

The deflecting material layer 310 is patterned, so that the patterned deflecting material layer (i.e. the deflecting layer 31) has a shape of a concave lens, and the concave surface thereof is away from the first substrate. In an example, the patterning is performed by photolithography. Here, a mask plate, such as a gray-scale mask, may be used to expose the photoresist layer formed on the deflecting material layer, and the photoresist layer may have the desired shape of the concave lens upon development by controlling the exposure of the photoresist layer at different locations. An ion beam etching process is used to etch the deflecting material layer with different depths at different locations, so that the shape of the concave lens of the photoresist layer is transferred to the deflecting material layer, thereby forming a deflecting layer having the shape of the concave, and then the photoresist layer is removed, to finish the patterning.

A flatting layer 32 is formed on the deflecting layer 31 (for example, by an applying process). For example, a material, such as a resin, may be provided on the deflecting layer, then subjected to thermocuring and/or photocuring, so that the flatting layer is provided on the deflecting layer more tightly. It should be understood that the surface, which is away from the deflecting layer, of the flatting layer may also be subjected to a planarization treatment according to requirement.

Figure 10:
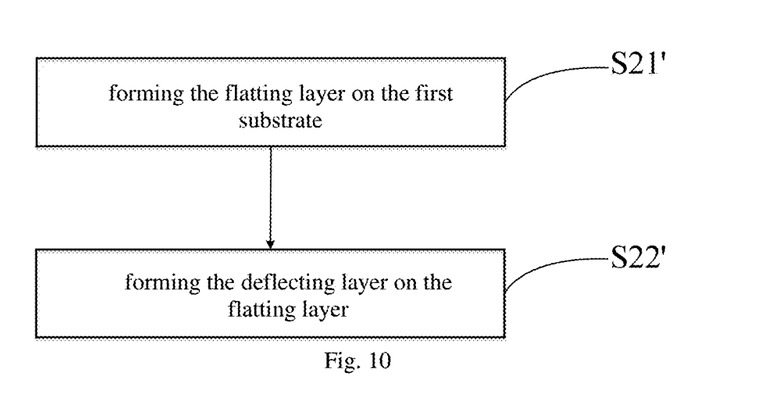
FIG. 10 is a flow chart of a method for forming an optical element according to an example of the present invention.

FIG. 10 is a flow chart of a method for forming an optical element according to an example of the present invention. Specifically, as shown in FIG. 10, forming an optical element may comprise the following steps:

S21'. forming the flatting layer on the first substrate; and

S22'. forming the deflecting layer on the flatting layer.

Figure 11:
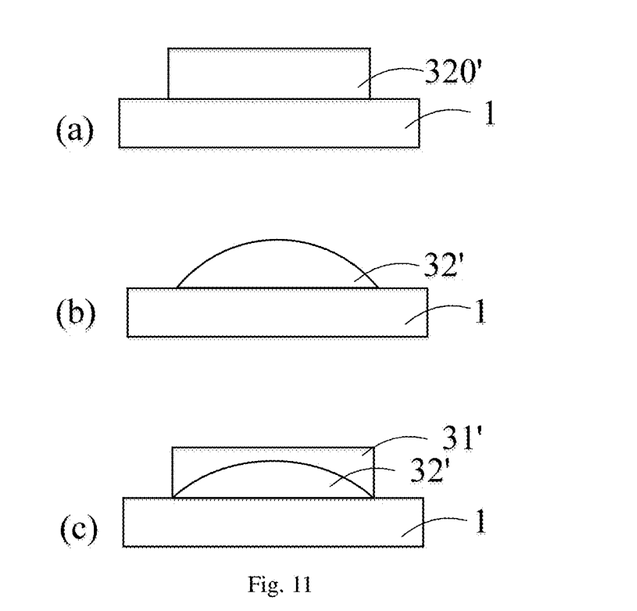
FIG. 11 is a further schematic drawing of a method for forming an optical element according to the example of FIG. 10.

FIG. 11 is a further schematic drawing of a method for forming an optical element according to the example of FIG. 10. As shown in FIG. 11, the method of forming the optical element specifically comprises the following steps.

A flatting material layer 320' is deposited on the first substrate.

A flatting material layer 320' is patterned, so that the patterned flatting material layer (i.e. the flatting layer 32') has a shape of convex lens complementary to the concave lens of the deflecting layer formed subsequently, and a convex surface of the convex lens is away from the first substrate. According to an example of the present invention, the flatting material layer may comprise a photosensitive resin. Upon exposure, for example, a mask plate, such as a gray-scale mask, may be used to control the exposure of the photosensitive resin at different locations, thereby obtaining the desired shape of the convex lens upon development, to finish the patterning. In another example, an ion beam etching process may also be used to etch the flatting material layer with different depths at different locations, so as to form a flatting layer having the shape complementary to the shape of the concave lens of the deflecting layer formed subsequently.

A deflecting layer 31' is formed on the flatting layer 32' (for example, by an applying process).

The scattering function of the deflecting layer may be adjusted by adjusting the difference between the refractive indices of the deflecting layer and the flatting layer and/or the gradient of the deflecting layer, so that the light-shielding zone of the second substrate may be evaded better. In an embodiment, the deflecting layer has a refractive index larger than that of the flatting layer.

In an embodiment, the refractive index of the deflecting layer and that of the flatting layer have a difference ranging from 2 to 3, and the distance between the deflecting layer and the light-shielding zone of the second substrate (i.e. the minimum among the distances from an arbitrary point on the deflecting layer to the second substrate) ranges from 135 to 185 μm. In an embodiment, the deflecting layer has a width equal to that of the light-shielding zone (e.g. a black matrix), and the deflecting layer has a curvature radius larger than half of the width of the deflecting layer.

The deflecting layer may be a material having a relatively high refractive index. For example, the deflecting layer may comprise silicon nitride and silica, and the flatting layer may comprise a resin.

Examples of the present invention can utilize efficiently the light going to the light-shielding zone of the panel, improve the transmittance of the display panel, and provide a solution for high alignment accuracy. By the methods of examples of the present invention, the alignment accuracy for the deflecting layer, the flatting layer and the first substrate may be increased up to about 1 μm. Further, by subjecting a first substrate provided with an optical element and a second substrate to cell assembly, the alignment accuracy may be effectively increased, thereby increasing the utilization rate of light of the display panel remarkably.

The display apparatus in an example of the present invention may be any product or member having the function of display, such as a cell phone, a tablet computer, a television, a laptop, a digital photo frame, a navigator, etc.

Certain examples have been described, which examples are represented in the way of examples, and are not aimed to limit the scope of the present invention. Actually, the novel example described here may be implemented in various other forms. Moreover, various omission, replacement, and modification may be made to the examples as described herein without departing the spirit of the present invention. The appended claims and the equivalent thereof are intended to cover such forms or modifications that fall into the scope and the spirit of the present invention.

What is claimed is:

1. A display panel, comprising a first substrate and a second substrate provided oppositely, wherein the second substrate has a light-transmitting zone and a light-shielding zone adjacent to the light-transmitting zone, wherein the display panel further comprises:
an optical element provided on a light entrance side, which is away from the second substrate, of the first substrate, wherein a projection of the optical element on the first substrate and a projection of the light-shielding zone on the first substrate at least partly overlap, and the optical element is configured to deflect a light, which enters from the light entrance side of the first substrate and goes towards the light-shielding zone, to the light-transmitting zone,
wherein the optical element consists of one deflecting layer having a shape of a concave lens and one flatting layer, which has a shape complementary to the deflecting layer to flat a concave surface of the deflecting layer,
wherein the deflecting layer has a width equal to that of the light-shielding zone of the second substrate, and the deflecting layer has a curvature radius larger than half of the width of the deflecting layer.

2. The display panel according to claim 1, wherein the concave surface of the deflecting layer is away from the first substrate, and the deflecting layer is positioned between the flatting layer and the first substrate.

3. The display panel according to claim 1, wherein the concave surface of the deflecting layer faces the first substrate, and the flatting layer is positioned between the deflecting layer and the first substrate.

4. The display panel according to claim 1, wherein the deflecting layer has a refractive index larger than that of the flatting layer.

5. The display panel according to claim 4, wherein the refractive index of the deflecting layer and that of the flatting layer have a difference ranging from 2 to 3.

6. The display panel according to claim 2, wherein a distance between the deflecting layer and the light-shielding zone of the second substrate ranges from 135 to 185 μm.

7. The display panel according to claim 1, wherein the deflecting layer comprises silicon nitride and silica, and the flatting layer comprises a resin.

8. A display apparatus comprising the display panel according to claim 1.

9. A manufacturing method of the display panel according to claim 1, comprising:
providing a first substrate;
forming an optical element on the first substrate;
providing a second substrate having a light-transmitting zone and a light-shielding zone adjacent to the light-transmitting zone; and
subjecting the first substrate and the second substrate to cell assembly via an alignment mark on the first substrate and an alignment mark on the second substrate, so that after the cell assembly has been performed, the first substrate and the second substrate are provided oppositely and the optical element is positioned on a light entrance side, which is away from the second substrate, of the first substrate,
wherein a projection of the optical element on the first substrate and a projection of the light-shielding zone on the first substrate at least partly overlap, and the optical element is configured to deflect a light, which enters from the light entrance side of the first substrate and goes towards the light-shielding zone, to the light-transmitting zone.

10. The manufacturing method of a display panel according to claim 9, wherein forming an optical element on the first substrate comprises:
forming a deflecting layer, wherein the deflecting layer has a shape of a concave lens.

11. The manufacturing method of a display panel according to claim 10, wherein forming an optical element on the first substrate further comprises:
forming a flatting layer, wherein the flatting layer has a shape complementary to the deflecting layer, to flat a concave surface of the deflecting layer.

12. The manufacturing method of a display panel according to claim 11, wherein forming the optical element comprises:
forming the deflecting layer on the first substrate; and
forming the flatting layer on the deflecting layer.

13. The manufacturing method of a display panel according to claim 12, wherein forming the deflecting layer on the first substrate comprises forming a deflecting material layer and patterning the deflecting material layer to form the deflecting layer having the shape of the concave lens, wherein patterning the deflecting material layer comprises:
forming a photoresist layer on the deflecting material layer,
subjecting the photoresist layer to uneven exposure;
developing the photoresist layer, so that the photoresist layer has a shape of a concave surface conforming to the shape of the concave lens;
etching the photoresist layer and the deflecting material layer by an ion beam etching process, to form the deflecting layer having the shape of the concave lens; and
removing the photoresist layer.

14. The manufacturing method of a display panel according to claim 11, wherein forming an optical element comprises:
forming the flatting layer on the first substrate; and
forming the deflecting layer on the flatting layer.

15. The manufacturing method of a display panel according to claim 14, wherein forming the flatting layer on the first substrate comprises: depositing a flatting material layer on the first substrate and patterning the flatting material layer to form the flatting layer having a shape complementary to the shape of the concave lens of the deflecting layer.

16. The manufacturing method of a display panel according to claim 15, wherein patterning the flatting material layer comprises:
forming an upper surface of the flatting material layer by using a photosensitive resin;
subjecting the photosensitive resin to uneven exposure; and
developing the photosensitive resin, so that the photosensitive resin has a shape of convex surface complementary to the shape of the concave lens.

17. The manufacturing method of a display panel according to claim 15, wherein patterning the flatting material layer comprises:

etching the flatting material layer by an ion beam etching process, so that the flatting material layer has a shape of convex surface complementary to the shape of the concave lens.

\* \* \* \* \*

UNITED STATES PATENT AND TRADEMARK OFFICE
CERTIFICATE OF CORRECTION

PATENT NO. : 10,281,763 B2
APPLICATION NO. : 15/678086
DATED : May 7, 2019
INVENTOR(S) : Yunyun Tian et al.

It is certified that error appears in the above-identified patent and that said Letters Patent is hereby corrected as shown below:

On the Title Page

Item (30) Foreign Application Priority Data:
Delete "2016 1 0839200"
Insert --2016 1 0839200.5--

Signed and Sealed this
Thirteenth Day of August, 2019

Andrei Iancu
*Director of the United States Patent and Trademark Office*